US012571291B1

(12) United States Patent
Khan et al.

(10) Patent No.: US 12,571,291 B1
(45) Date of Patent: Mar. 10, 2026

(54) METHODS AND COMPOSITIONS FOR THERMALLY SHOCKING SUBSURFACE FORMATIONS

(71) Applicants: Saudi Arabian Oil Company, Dhahran (SA); King Fahd University of Petroleum and Minerals, Dhahran (SA)

(72) Inventors: Fahad Khan, Dhahran (SA); Mohamed Ahmed Nasr Aldeen Mahmoud, Dhahran (SA); Arshad Raza, Dhahran (SA); Murtadha J. AlTammar, Dhahran (SA); Shirish Patil, Dhahran (SA)

(73) Assignees: Saudi Arabian Oil Company, Dhahran (SA); King Fahd University of Petroleum and Minerals, Thuwal (SA)

( * ) Notice: Subject to any disclaimer, the term of this patent is extended or adjusted under 35 U.S.C. 154(b) by 0 days.

(21) Appl. No.: 19/009,602

(22) Filed: Jan. 3, 2025

(51) Int. Cl.
| | |
|---|---|
| *E21B 43/26* | (2006.01) |
| *C09K 8/68* | (2006.01) |
| *E21B 36/00* | (2006.01) |

(52) U.S. Cl.
CPC .............. *E21B 43/26* (2013.01); *C09K 8/685* (2013.01); *E21B 36/001* (2013.01)

(58) Field of Classification Search
CPC ........ E21B 43/26; E21B 36/001; C09K 8/685
See application file for complete search history.

(56) References Cited

U.S. PATENT DOCUMENTS 9,920,608 B2    3/2018  van Oort et al.
2014/0374108 A1*  12/2014  Vandeponseele ....... E21B 43/26
                                              166/308.2
(Continued)

FOREIGN PATENT DOCUMENTS

WO     WO-2022079039 A1 *  4/2022   ......... E21B 47/0175

OTHER PUBLICATIONS

Khan et al., "Application of Endothermic Fluids to Lower the Breakdown Pressure of Unconventional Reservoirs: Implications for Hydraulic Fracturing", ACS Omega, https://doi.org/10.1021/acsomega.4c04919, Aug. 14, 2024.
(Continued)

*Primary Examiner* — Silvana C Runyan
(74) *Attorney, Agent, or Firm* — DINSMORE & SHOHL LLP

(57) ABSTRACT

A crosslinked endothermic fluid composition may comprise an aqueous solution; ammonium chloride; a polymer; and a crosslinker. A method of thermally shocking a subsurface formation may comprise introducing the crosslinked endothermic fluid composition into a wellbore fluidly connected to the subsurface formation; exposing the crosslinked endothermic fluid composition to the subsurface formation, such that a temperature of the subsurface formation at least partially breaks a crosslink of the crosslinked endothermic fluid composition and exposes at least a portion of the ammonium chloride; reacting the ammonium chloride in the crosslinked endothermic fluid composition with fluids of the subsurface formation, thereby decreasing a temperature of the subsurface formation and producing ammonia; and thermally shocking the subsurface formation via the decreased temperature and produced ammonia, thereby inducing one or more fractures in the subsurface formation.

20 Claims, 7 Drawing Sheets

(56) References Cited

U.S. PATENT DOCUMENTS

| | | | | |
|---|---|---|---|---|
| 2016/0145486 A1* | 5/2016 | Weaver | ................... | C09K 8/40 |
| | | | | 507/260 |
| 2021/0280899 A1* | 9/2021 | Yadav | ................. | H01M 10/054 |
| 2021/0403799 A1* | 12/2021 | Li | ...................... | G01N 33/5073 |
| 2022/0348815 A1* | 11/2022 | Chang | ...................... | C09K 8/92 |

OTHER PUBLICATIONS

Yuan et al., "Evaluation of a control-released in-situ generated acid tablet for acid fracturing", Journal of Petroleum Science and Engineering, vol. 174, pp. 384-393, 2019.

* cited by examiner

Before Treatment

After Treatment

METHODS AND COMPOSITIONS FOR THERMALLY SHOCKING SUBSURFACE FORMATIONS

FIELD

The present disclosure generally relates to crosslinked endothermic fluid compositions, as well as methods of forming and utilizing the same, for producing fluids from subsurface formations. More particularly, embodiments herein relate to methods and compositions for thermally shocking a subsurface formation, as detailed herein.

BACKGROUND

Unconventional reservoir rocks are typically characterized by very low permeability and porosity. To make cost-effective production from these reservoirs, unconventional means such as horizontal drilling and hydraulic fracturing are typically practiced. In hydraulic fracturing, also referred to as 'fracking', a fluid is pumped at high pressure into the subsurface formation, generating one or more elongated fractures in the subsurface formation that may be propped open by a subsequently placed proppant. These propped open fractures form a higher permeability conduit within the formation, enabling increasing recovery of fluids from the same.

However, during hydraulic fracturing, the formation breakdown pressure (pressure at which the first fractures begin to form) is of great importance and depends on geomechanical characteristics (strength and Poisson's ratio). As previously mentioned, typically great pressures and large amounts of injected fluid are needed to achieve initial formation breakdown, adding substantial cost and material needs to the process.

SUMMARY

Thus, continuously desired are alternative or supplemental methods to reduce the amount of fluid and/or pressure need to fracture subsurface formations. Embodiments herein fulfill the aforementioned need by providing compositions and methods for inducing thermal shock in the subsurface formation, thereby softening and/or forming one or more fractures in the same. The resultant softening and/or one or more fractures may operate to decrease a compressive strength and Poisson's ratio of the subsurface formation, thereby also decreasing the formation breakdown pressure. The net result is that the entire hydraulic fracturing operation may need to use less fluid and less pressure to adequately fracture the subsurface formation, thereby resulting in considerable cost and materials saving.

Particularly, in one more embodiments herein, a crosslinked endothermic fluid composition is provided that may contain endothermic compounds (namely ammonium chloride) that rapidly decrease in temperature when exposed to water and/or a hydroxide-containing compound. However, the crosslink in the crosslinked endothermic fluid composition contains and/or encapsulates the ammonium chloride, such that the ammonium chloride does not react at static conditions.

However, after being exposed to a subsurface formation, the crosslinks in the crosslinked endothermic fluid compound may at least partially break due to the increased subsurface formation temperature, thereby releasing the ammonium chloride and exposing the same to subsurface fluids and/or an endothermic booster fluid containing the hydroxide-containing compound. Upon exposure, the ammonium chloride may react, decreasing the temperature of the subsurface formation, releasing ammonia, and thereby inducing thermal shock and one or more fractures in the subsurface formation.

In accordance with one embodiment herein, A method of thermally shocking a subsurface formation may comprise introducing a crosslinked endothermic fluid composition into a wellbore fluidly connected to the subsurface formation, the endothermic fluid composition comprising an aqueous solution, ammonium chloride, a polymer, and a crosslinker; exposing the crosslinked endothermic fluid composition to the subsurface formation, such that a temperature of the subsurface formation at least partially breaks a crosslink of the crosslinked endothermic fluid composition and exposes at least a portion of the ammonium chloride; reacting the ammonium chloride in the crosslinked endothermic fluid composition with fluids of the subsurface formation, thereby decreasing a temperature of the subsurface formation and producing ammonia; and thermally shocking the subsurface formation via the decreased temperature and produced ammonia, thereby inducing one or more fractures in the subsurface formation.

In accordance with another embodiment herein, a crosslinked endothermic fluid composition may comprise an aqueous solution; ammonium chloride; a polymer; and a crosslinker.

In accordance with yet another embodiment herein, a method of forming a crosslinked endothermic fluid composition may comprise adding a polymer to an aqueous solution; adding ammonium chloride to the aqueous solution, thereby decreasing a temperature of the aqueous solution; continuing to add the ammonium chloride to the aqueous solution after the temperature of the aqueous solution stabilizes, thereby forming an over-saturated endothermic fluid; and adding a crosslinker to the aqueous solution, thereby forming the crosslinked endothermic fluid composition.

BRIEF DESCRIPTION OF THE DRAWINGS

The following detailed description of specific embodiments of the present disclosure can be best understood when read in conjunction with the following drawings, where like structure is indicated with like reference numerals and in which.

Figure (FIG. 1 illustrates a system for thermally shocking a subsurface formation, according to embodiments herein.

Figure 1:
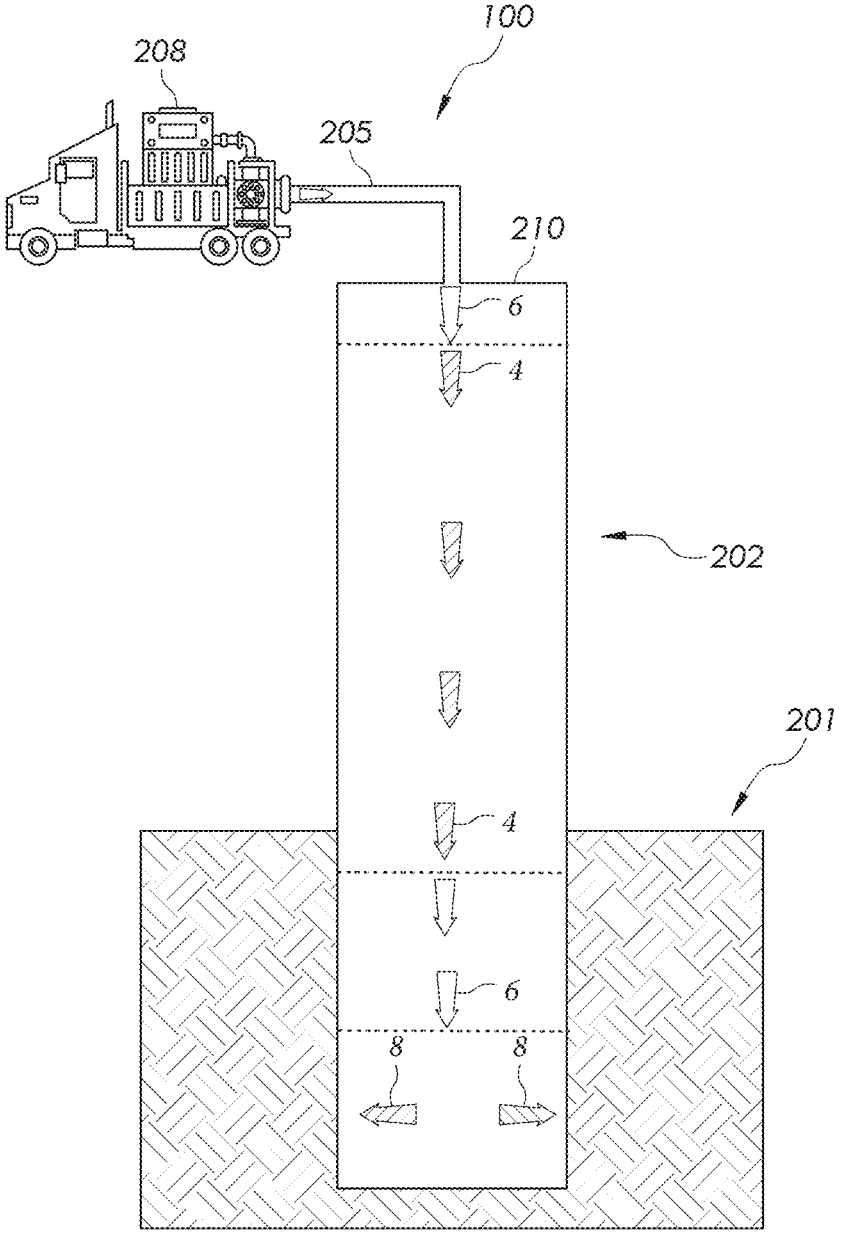

For the purpose of describing the simplified schematic illustrations and descriptions of the relevant figures, the numerous valves, temperature sensors, electronic controllers and the like that may be employed and well known to those of ordinary skill in the art of certain chemical processing operations and or hydraulic fracturing operations are not included. It should be understood that these components are within the spirit and scope of the present embodiments disclosed. However, operational components, such as those described in the present disclosure, may be added to the embodiments described in this disclosure.

Reference will now be made in greater detail to various embodiments, some embodiments of which are illustrated in the accompanying drawings. Whenever possible, the same reference numerals will be used throughout the drawings to refer to the same or similar parts.

DETAILED DESCRIPTION

As previously stated, embodiments described herein generally relate to methods, compositions, and systems for producing fluids from subsurface formations. More particularly, embodiments herein relate to methods and compositions for thermally shocking a subsurface formation, as detailed herein.

As used throughout this disclosure, the terms "downhole" and "uphole" may refer to a position within a wellbore relative to the surface, with uphole indicating direction or position closer to the surface and downhole referring to direction or position farther away from the surface.

As described in the present disclosure, a "subsurface formation" may refer to a body of rock that is sufficiently distinctive and continuous from the surrounding rock bodies that the body of the rock may be mapped as a distinct entity. A subsurface formation is, therefore, sufficiently homogenous to form a single identifiable unit containing similar properties throughout the subsurface formation, including, but not limited to, porosity and permeability.

As used throughout this disclosure, "thermal shock" may refer to a process a material undergoes upon experiencing an abrupt heat flux or temperature gradient change. Upon experiencing the same, the material undergoes significant thermal stress and strain, often causing material failure. The material failure may be observed in terms of cracks or loss of compressive or tensile strength in the material.

As used throughout this disclosure, "wellbore," may refer to a drilled hole or borehole extending from the surface of the Earth down to the subsurface formation, including the openhole or uncased portion. The wellbore may form a pathway capable of permitting fluids to traverse between the surface and the subsurface formation. The wellbore may include at least a portion of a fluid conduit that links the interior of the wellbore to the surface. The fluid conduit connecting the interior of the wellbore to the surface may be capable of permitting regulated fluid flow from the interior of the wellbore to the surface and may permit access between equipment on the surface and the interior of the wellbore.

As used throughout this disclosure, a "wellbore wall" may refer to the interface through which fluid may transition between the subsurface formation and the interior of the wellbore. The wellbore wall may be unlined (that is, bare rock or formation) to permit such interaction with the subsurface formation or lined, such as by a tubular string, so as to prevent such interactions. The wellbore wall may also define the void volume of the wellbore.

Referring initially to FIG. 1, illustrated is a system 100 for thermally shocking a subsurface formation 201, such as by utilizing a crosslinked endothermic fluid composition 4. In one or more embodiments herein, the crosslinked endothermic fluid composition 4 may comprise an aqueous solution and one or more components operable to form ammonia when reacted. For example, and in embodiments, the crosslinked endothermic fluid composition 4 may comprise the aqueous solution and ammonium chloride. The crosslinked endothermic fluid composition 4 may also comprise components operable to crosslink the fluid, such as a polymer and a crosslinker.

Embodiments herein may also utilize an endothermic booster fluid 8, which may comprise a hydroxide-containing compound, such as barium hydroxide or sodium hydroxide, as well as a second aqueous solution, which may be similar or identical to the aqueous solution for the crosslinked endothermic fluid composition 4. Additionally, the endothermic booster fluid 8 may itself comprise a polymer and a crosslinker, which may be similar or identical to polymer and crosslinker for the crosslinked endothermic fluid composition 4.

Further embodiments herein may also utilize a spacer fluid 6, which may comprise a third aqueous solution, which may be similar or identical to the aqueous solution for the crosslinked endothermic fluid composition 4. Additionally, the spacer fluid 6 may itself comprise a polymer and a crosslinker, which may be similar or identical to the polymer and crosslinker for the crosslinked endothermic fluid composition 4.

In such embodiments including both the crosslinked endothermic fluid composition 4 and the endothermic booster fluid 8 comprising barium hydroxide, the endothermic reaction may proceed according to Equations I and II below, wherein the ammonium chloride reacts primarily with the barium hydroxide but also to a lesser extent with the aqueous solution:

$$NH_4Cl(s)+H_2O(l){\rightarrow}NH_4{}^+(aq)+Cl^-+H_2O(l)$$
$$\qquad{\rightarrow}NH_4OH+HCl(l) \qquad\qquad (I); and$$

$$NH_4Cl(s)+BaOH(aq){\rightarrow}NH_3{}^+(g)+BaCl(aq)+H_2O(l) \qquad (II)$$

In such embodiments including both the crosslinked endothermic fluid composition 4 and the endothermic booster fluid 8 comprising sodium hydroxide, the endothermic reaction may proceed according to Equations I and III below, wherein the ammonium chloride reacts primarily with the sodium hydroxide but also to a lesser extent with the aqueous solution:

$$NH_4Cl(s)+NaOH(aq)\rightarrow NH_3^+(g)+NaCl(aq)+H_2O(l) \quad\quad (III).$$

As shown in the examples hereinbelow, the reaction between ammonium chloride and water may generally be less endothermic than reactions between ammonium chloride and hydroxide containing compounds, such that it may be desired to optimize the crosslinked endothermic fluid composition 4 towards the ammonium chloride and hydroxide containing compound reaction.

Further, sodium hydroxide may be preferable to barium hydroxide, and in particular barium hydroxide octahydrate, due at least to barium hydroxide's relatively low solubility in the aqueous solution as compared to sodium hydroxide. Particularly, it is contemplated that combinations of the crosslinked endothermic fluid composition 4 and the endothermic booster fluid 8 comprising the barium hydroxide may not completely dissolve without the provision of a greater ratio of water. However, the provision of a greater ratio of water may also bias the crosslinked endothermic fluid composition 4 towards the relatively less endothermic water and ammonium chloride reactions as compared to sodium hydroxide and ammonium chloride.

Accordingly, to bias the crosslinked endothermic fluid composition 4 towards reactions between the sodium hydroxide and ammonium chloride, a molar ratio between the sodium hydroxide and the ammonium chloride, in the respective crosslinked endothermic fluid composition 4 and the endothermic booster fluid 8, may be from 1:1 to 15:1 sodium hydroxide to ammonium chloride, such as from 1:1 to 2:1, from 2:1 to 5:1, from 5:1 to 10:1, from 10:1 to 12:1, from 12:1 to 15:1, or any combination of the previous ranges or smaller range therein, such as from 2:1 to 12:1 sodium hydroxide to ammonium chloride.

Further, a concentration of the ammonium chloride in the aqueous solution, i.e., in the endothermic fluid, may be from 0.1 Molar to 5 Molar, such as from 0.1 Molar to 0.4 Molar, from 0.4 Molar to 0.5 Molar, from 0.5 Molar to 0.6 Molar, from 0.6 Molar to 1 Molar, from 1 Molar to 5 Molar, or any combination of the previous ranges or smaller range therein, such as from 0.4 Molar to 0.6 Molar. Further yet, a concentration of the sodium hydroxide in the aqueous solution, i.e. in the endothermic fluid, may be from 0.1 Molar to 32 Molar, such as from 0.1 Molar to 0.5 Molar, from 0.5 Molar to 1 Molar, from 1 Molar to 2 Molar, from 2 Molar to 6 Molar, from 6 Molar to 10 Molar, from 10 Molar to 16 Molar, from 16 Molar to 32 Molar, or any combination of the previous ranges or smaller range therein, such as from 1 Molar to 6 Molar.

As previously stated, the crosslinked endothermic fluid composition 4 may comprise an aqueous solution. The aqueous solution may comprise distilled water, deionized water, or tap water. In embodiments, the aqueous solution may additionally comprise additives or contaminants. For example, the aqueous solution may comprise freshwater, seawater, natural brine, synthetic brine, formation water, salt water, or combinations thereof.

As previously stated, the crosslinked endothermic fluid composition 4 may comprise the polymer and the crosslinker. The polymer may comprise guar, cellulose, or both, such as hydroxy propyl guar, carboxy methyl hydroxyl propyl guar (CMHPG), hydroxy propyl cellulose, carboxy methyl hydroxyl ethyl cellulose, and/or any other water soluble polymers are contemplated. The crosslinker may comprise borate, zirconium, titanium, aluminum, or combinations thereof.

Without being limited by theory, it is contemplated that the polymer/crosslinker pair of guar and borate may be preferred due to borate's tendency to break at lower temperatures. However, it should be understood that any polymer/crosslinker pair that may be expected to break at the temperatures predicted for the particular subsurface formation 201 may be used.

Now referring back to FIG. 1, the system 100 may comprise a subsurface formation 201, a wellbore 202, and a wellhead 210. Moreover, while the wellbore 202 and the subsurface formation 201 are shown to be vertical, the wellbore 202 in at least some embodiments may at least partially horizontal, i.e., the wellbore 202 may be part of a horizontally drilled well, as may be understood in the art. The subsurface formation 201 may comprise an unconventional reservoir, such as a shale. However, the subsurface formation 201 may also be a conventional reservoir, such as a sandstone.

Figure 2:
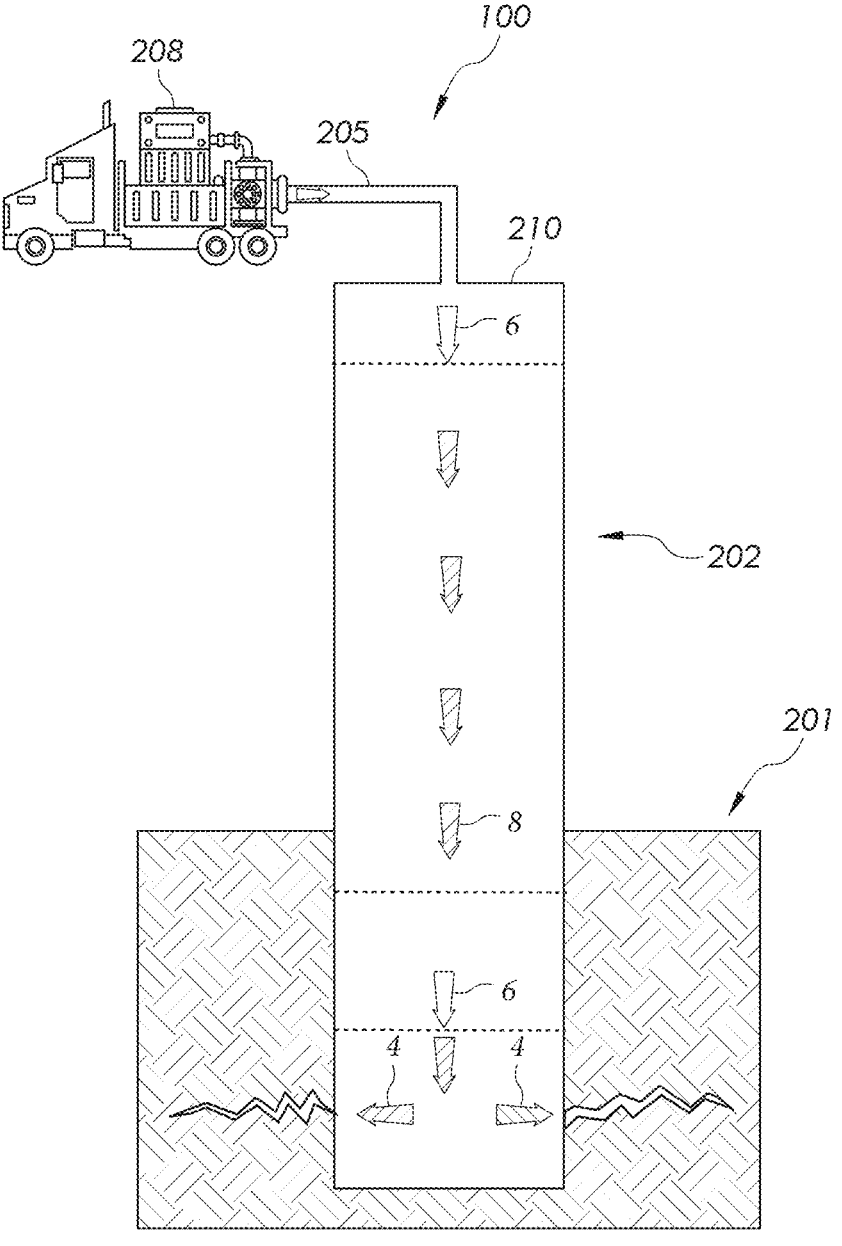
FIG. 2 illustrates a progression of the system of FIG. 1, according to embodiments herein.
Figure 3:
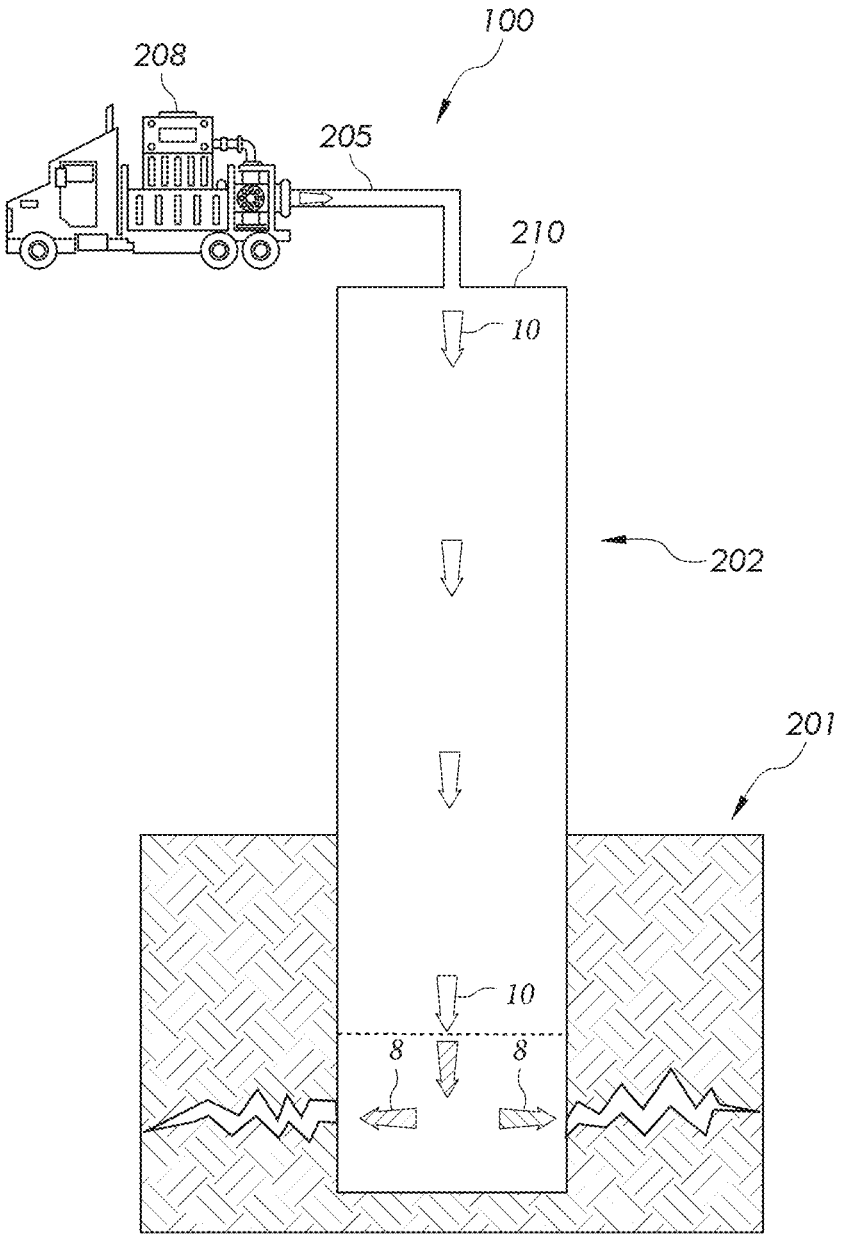
FIG. 3 illustrates another progression of the system of FIGS. 1-2, according to embodiments herein.

As shown in FIGS. 1-3, the wellbore 202 may be fluidly connected to the subsurface formation 201, such as by the wellbore 202 wall. The wellbore 202 may also be fluidly connected to the wellhead 210 positioned at the surface by a fluid conduit from the surface to a termination point in the wellbore 202 proximal the subsurface formation 201, such that fluid injected into the wellbore 202 is primarily exposed to the subsurface formation 201.

As previously stated, the systems herein may be utilized to thermally shock the subsurface formation 201, such as by introducing the crosslinked endothermic fluid composition 4 to the subsurface formation 201. As previously stated, the ammonium chloride may spontaneously react with water and/or the hydroxide compound from the endothermic booster fluid 8 to form ammonia gas in an endothermic reaction. However, by encasing the ammonium chloride in a crosslinked fluid utilizing the polymer and the crosslinker, reactions with water and/or the hydroxide compound may be delayed until the crosslink breaks, as explained in further detail herein.

As previously stated, embodiments herein may be directed to thermally shocking a subsurface formation 201, such as by introducing the crosslinked endothermic fluid composition 4. Accordingly, as shown in FIGS. 1-3, the system 100 may further comprise one or more fluid injection pumps 208 configured to supply the endothermic fluid to the subsurface formation 201, such as through one or more injection lines 205 fluidly connected to the wellhead 210. The crosslinked endothermic fluid composition 4 may be supplied to the one or more fluid injection pumps 208 through one or more storage vessels, each storage vessel containing one of the components of the crosslinked endothermic fluid composition 4, or multiple components of the crosslinked endothermic fluid composition 4.

In embodiments, the crosslinked endothermic fluid composition 4 may be transported to the wellhead 210 as a completed product, i.e., already crosslinked. However, in at least some embodiments, the crosslinked endothermic fluid composition 4 may instead be delivered as its constituent components. Accordingly, in at least some embodiments, some level of preparation may be required prior to introducing the crosslinked endothermic fluid composition 4. For example, embodiments herein may include a method of making the endothermic fluid composition, which may in turn be encompassed in the method of thermally shocking the subsurface formation 201.

The method of making may comprise adding the polymer to the aqueous solution. The method may then comprise adding the ammonium chloride to the aqueous solution, thereby decreasing a temperature of the aqueous solution by the reaction of the ammonium chloride with the aqueous solution. However, the method may further comprise continuing to add the ammonium chloride to the aqueous solution after the temperature of the aqueous solution stabilizes, thereby forming an over-saturated endothermic fluid. The method may then comprise adding the crosslinker to the aqueous solution, thereby forming the crosslinked endothermic fluid composition 4.

As previously stated, the method of making may be incorporated in the method of utilizing the crosslinked endothermic fluid composition 4, i.e. the method of thermally shocking the subsurface formation 201. Accordingly, and still referring to FIGS. 1-3, the method may comprise introducing the crosslinked endothermic fluid composition 4 into the wellbore 202. The method may also comprise exposing the crosslinked endothermic fluid composition 4 to the subsurface formation 201. In exposing the crosslinked endothermic fluid composition 4 to the subsurface formation 201, the crosslinked endothermic fluid composition 4 may also be exposed to subsurface formation 201 fluids and elevated formation temperature. In embodiments, the elevated formation temperature may operate to at least partially break a crosslink in the crosslinked endothermic fluid composition 4, such that at least a portion of the ammonium chloride is exposed. The method may then comprise reacting the ammonium chloride in the crosslinked endothermic fluid composition 4 with fluids of the subsurface formation 201, thereby decreasing a temperature of the subsurface formation 201 and producing ammonia.

The method may then comprise thermally shocking the subsurface formation 201 via the decreased temperature and produced ammonia, thereby inducing one or more fractures in the subsurface formation 201. As shown in the examples herein, exposure of the reacted crosslinked endothermic fluid composition 4 may reduce a compressive strength and a Poisson's ratio of the subsurface formation 201. Particularly, as shown in the Examples, the crosslinked endothermic fluid composition 4 may reduce a compressive strength and/or Poisson's ratio of the subsurface formation 201 by at least 10 percent, such as from 10 to 11%, from 11 to 12%, from 12 to 15%, from 15 to 20%, from 20 to 25%, from 25 to 30%, from 30 to 50%, or combinations of the previous ranges or smaller ranges therein, such as from 10% to 30%.

As previously stated, reaction of the ammonium chloride with the hydroxide-containing compound may be preferable to water due to the increased endothermic effect as well as increased ammonia. Accordingly, the method may further comprise introducing the endothermic booster fluid 8 into the wellbore 202 before or after introducing the crosslinked endothermic fluid composition 4. The method may then comprise reacting the ammonium chloride with the sodium hydroxide of the endothermic booster, thereby further decreasing a temperature of the endothermic fluid and producing additional ammonia; and thermally shocking the subsurface formation 201 via the decreased temperature and ammonia, thereby inducing one or more additional fractures in the subsurface formation 201.

However, as previously stated, ammonium chloride and the hydroxide-containing compound may spontaneously react upon contact. Further, the hydroxide-containing compound, as a base, may operate to reduce the pH of the crosslinked endothermic fluid composition 4, such that the pH-dependent crosslink of the crosslinked endothermic fluid composition 4 may be disturbed and/or broken. Accordingly, it may be desired to segregate the ammonium chloride from the hydroxide-containing compound, and thereby the crosslinked endothermic fluid composition 4 from the endothermic booster fluid 8 until the crosslinked endothermic fluid composition 4 is exposed to the subsurface formation 201. Consequently, in at least some embodiments, the method may further comprise introducing the spacer fluid 6 into the wellbore 202 between introducing the endothermic booster fluid 8 and the crosslinked endothermic fluid composition 4.

As previously stated, the methods of thermally shocking the subsurface formation 201 may reduce the compressive strength and/or Poisson's ratio of the subsurface formation 201, which may aid in future hydraulic fracturing operations. Accordingly, in at least one embodiment, the method may further comprise introducing a hydraulic fracturing composition into the subsurface formation 201 after exposing the reacted endothermic fluid to the subsurface formation 201, thereby increasing a size of the one or more fractures in the subsurface formation 201. The method may also comprise introducing a proppant into the subsurface formation 201, such as with the crosslinked endothermic fluid composition 4, the endothermic booster fluid 8, the spacer, the hydraulic fracturing composition, or combinations thereof, thereby propping open at least a portion of the one or more fractures in the subsurface formation 201.

EXAMPLES

The crosslinked endothermic fluid compositions and endothermic booster fluids described herein were tested to determine their suitability for use with different formations as a breakdown fluid and/or as a hydraulic fracturing fluid itself.

Figure 4:
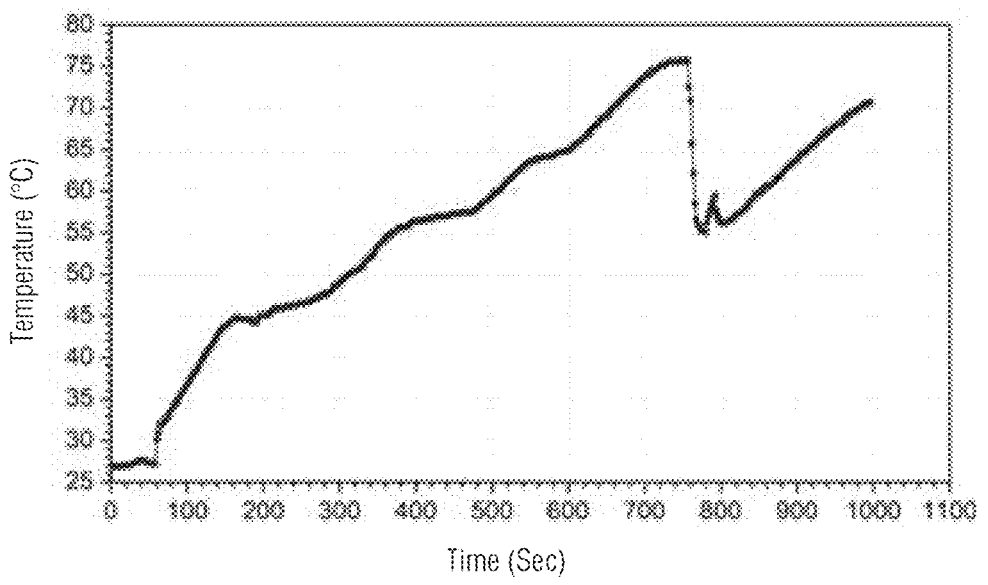
FIG. 4 illustrates the endothermic temperature alteration performance of the crosslinked endothermic fluid composition upon the breakdown of the crosslink by temperature, according to one or more embodiments herein.

In a first test, the crosslinked endothermic fluid composition was mixed with water and heated while continuously recording the real-time temperature. The data was exported and the temperature versus time duration graph was plotted and shown in FIG. 4. It can be seen that the temperature kept increasing up to 75° C., which shows that the ammonium chloride particles did not interact with the added water till that temperature. After this temperature was reached the crosslinking of the polymer was degraded and the particles were released which reacted with the added water and reduced the temperature by almost 20° C. (75 to 55° C.) within 20 seconds. It should be noted that the temperature reduction is also a function of the volume of reactant used. For the field application where huge amounts of chemicals are injected, the temperature reduction will be more and for a longer duration. This sudden temperature reduction can generate a thermal shock, as previously explained, which can help in reducing the strength of rocks.

Further, it was observed that when the ammonium chloride reacts with water, there is a reduction in the pH level of the solution. The $NH_4Cl$ reacting with water generates HCl in the solution, which is responsible for the reduction in pH level. For example, it can be shown from Table 3 that the pH of the crosslinked endothermic fluid composition is around 5 for the three cases which falls to 4.5 after reacting with water. It should be noted that the pH value was not reduced to a very low level as in the case of pure HCl generation as there is also generation of $NH_4OH$, which acts as a weak base and/or buffer, keeping the pH slightly higher.

TABLE 1

| | | | | | pH of | Water | pH |
|---|---|---|---|---|---|---|---|
| | Volume | | | | cross- | added | after |
| | De- | | Dis- | Sus- | linked | for | re- |
| Case | ionized | | solved | pended | solution | reaction | action |
| # | Water | CMHPG | $NH_4Cl$ | $NH_4Cl$ | | (mL) | |
| Units | (mL) | (grams) | (grams) | (grams) | — | | — |
| 1 | 30 | 0.1125 | 8 | 12 | 5 | 15 | 4.46 |
| 2 | 60 | 0.225 | 16 | 24 | 5.09 | 25 | 4.45 |
| 3 | 120 | 0.45 | 32 | 48 | 5.23 | 50 | 4.6 | pH Variation Before and After Reaction with Water

Without being limited by theory, the generated HCl may also be helpful in carbonate-dominated shale rocks where HCl can dissolve the carbonate present in the rocks as shown in Equation IV below. This may operate to create acid etching downhole in addition to the thermal shock, further leading to a reduction in the strength of the formation.

$$CaCO_3(s)+2HCl(aq) \rightarrow CaCl_2(aq)+H_2O(l)+CO_2(g) \qquad (IV).$$

Viscosity is very important for the design of fracturing fluid. It directly affects the width of the fracture which in turn is related to the ultimate hydrocarbon recovery. Further, for conventional reservoirs having good permeability, the viscosity of the fracturing fluid at the downhole condition may be kept high while for unconventional wells having very low permeability, the viscosity may be kept low. Accordingly, in a second test, the viscosity of the crosslinked endothermic fluid composition was observed over time, to ensure sufficient breakage of the crosslinks and subsequent release and reaction of the ammonium chloride.

Figure 5:
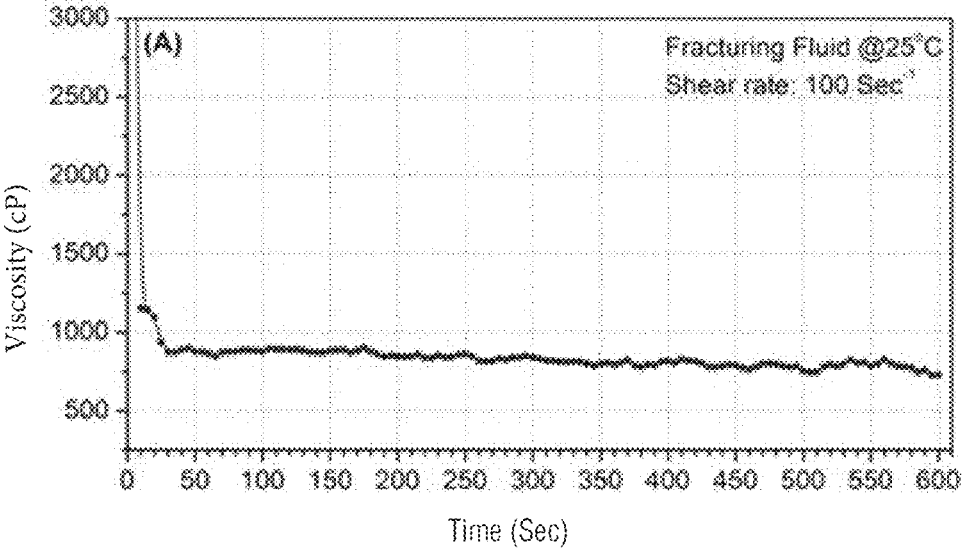
FIG. 5 illustrates the viscosity and crosslink breakdown of the crosslinked endothermic fluid composition at 25° C., according to one or more embodiments herein, having a y-axis going from 0 cP to 3000 cP.
Figure 6:
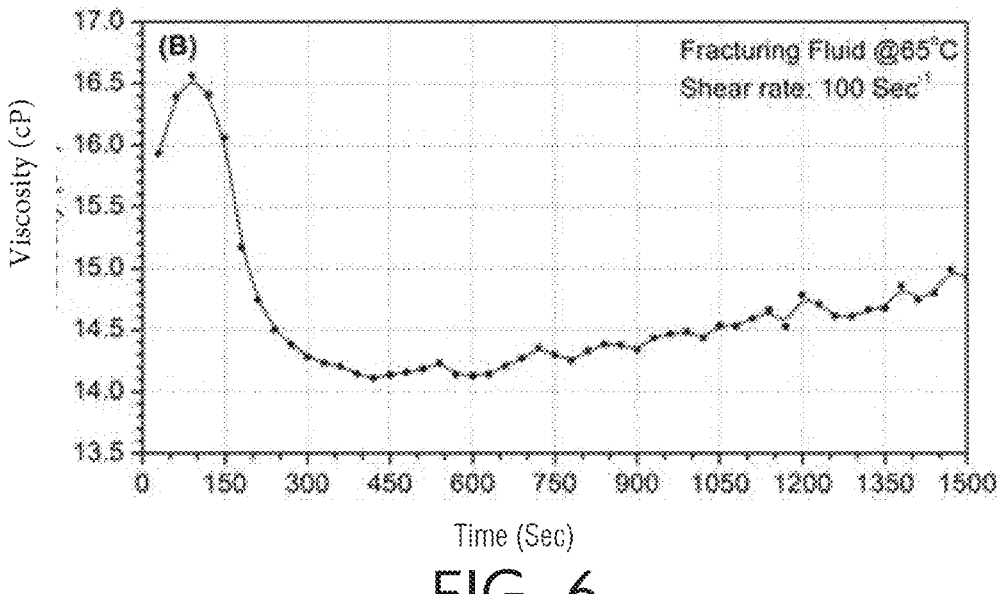
FIG. 6 illustrates the viscosity and crosslink breakdown of the crosslinked endothermic fluid composition at 65° C., according to one or more embodiments herein, having a y-axis going from 13.5 cP to 17 cP.
Figure 7:
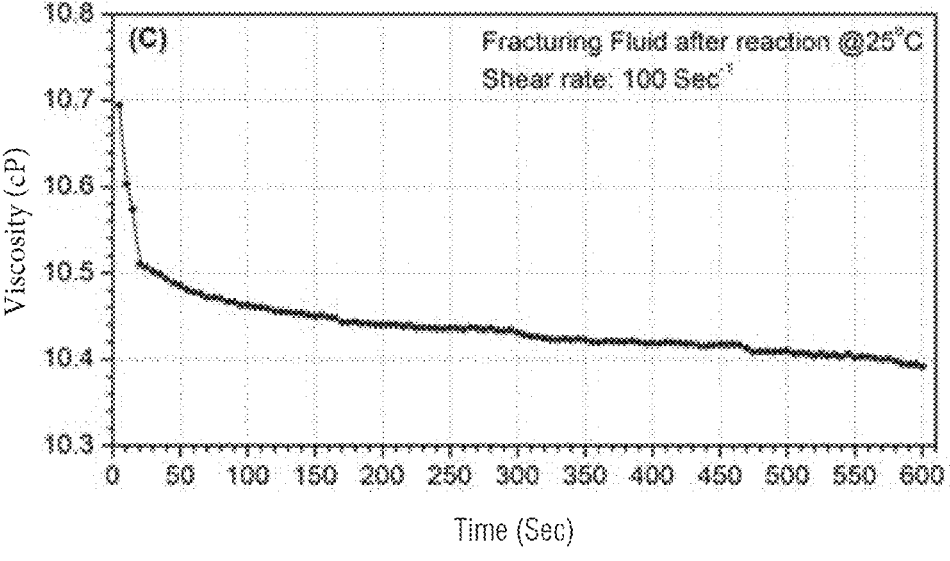
FIG. 7 illustrates the continued loss in viscosity of the crosslinked endothermic fluid composition post endothermic reaction with water, according to one or more embodiments herein, having a y-axis going from 10.3 cP to 10.8 cP.

The viscosity of the crosslinked endothermic fluid composition was measured using a rheometer at a constant shear rate of 100 sec-1 for 600 seconds. The viscosity of the crosslinked endothermic fluid composition was measured at room temperature (20-22° C.) and an elevated temperature of 65° C., as well as the final temperature after reaction. This is shown in FIGS. 5-7.

It can be seen that the viscosity of the fluid at room temperature is around 700-800 cP while at higher temperatures it reduces to 14.5 cP. Thus, at reservoir conditions, the viscosity of the fluid is low and as such can be used in unconventional reservoirs. Without being limited by theory, this reduction in the viscosity is due to the breakdown of borate crosslinking at the elevated temperature. Accordingly FIGS. 5-7 illustrate that the synthesized fracturing fluid is self-breaking with temperature without the use of any external breaker additive. After the breakdown and reacting with NaOH solution or water and providing the thermal shock, the fluid may be flowed back to surface, hence the resulting viscosity of the fluid should be low. It can be seen in FIG. 7 that the viscosity after the reaction-n reduces to around 10 cP which can easily be flown back to the surface.

Figure 8:
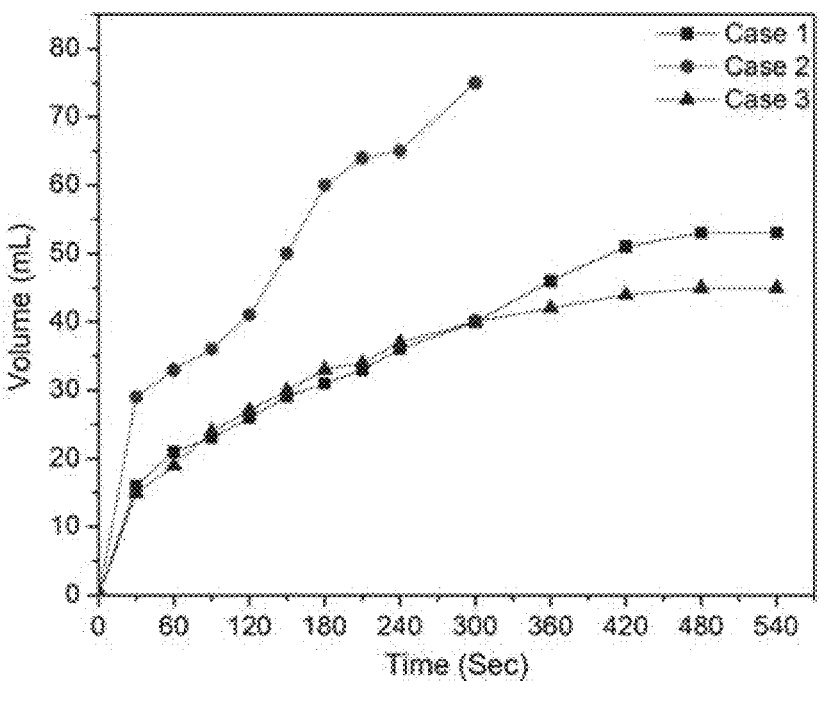
FIG. 8 illustrates the volume of water displaced by ammonia generated from the crosslinked endothermic fluid with the endothermic booster fluid at varying concentrations of the ammonium chloride and hydroxide compound.

As previously stated, ammonia generation may also play a part in reducing the breakdown strength of the subsurface formation, as well as in forming the initial fractures in the hydraulic fracturing process, which may be enhanced by the endothermic booster fluid, and in particular the hydroxide-containing compound. Accordingly, a third test was conducted to quantify ammonia generation as a function of the concentration of the ammonium chloride and the hydroxide-containing compound, particularly sodium hydroxide. The results are shown by FIG. 8 and Table 2 below.

TABLE 2

| | | | Ammonia | | Ammonia |
|---|---|---|---|---|---|
| Case # | $NH_4Cl$ | NaOH | Generated | Time | Evolution Rate |
| Units | (grams) | (grams) | (mL) | (sec) | (mL/sec) |
| 1 | 12 | 8 | 53 | 540 | 0.0981 |
| 2 | 12 | 16 | 75 | 300 | 0.25 |
| 3 | 6 | 8 | 45 | 540 | 0.083 |

Ammonia Evolution with respect to Reactant Ratios

As shown in FIG. 8 and Table 2, the It can be observed that when the NaOH concentration is doubled, the rate of ammonia gas generation also increases drastically whereas, with the change in concentration of NH4Cl, there is a lesser change in the rate of gas generation. The rate of the reaction can be written according to Equation V, which when solved for the variables k, a, and b, results in Equation VI:

$$r=k*[NH4Cl]^{a}*[NaOH]^{b} \qquad (V); and$$

$$r=3.31 \times 10^{-3}*[NH4Cl]^{0.236}*[NaOH]^{1.348} \qquad (VI).$$

Figure 9:
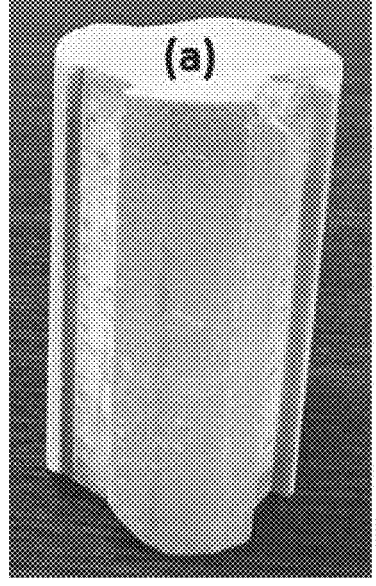
FIG. 9 illustrates a side view of Kentucky Sandstone and Eagleford Shale core samples, respectively, after being exposed to the endothermic fluid composition, according to one or more embodiments herein.
Figure 9:
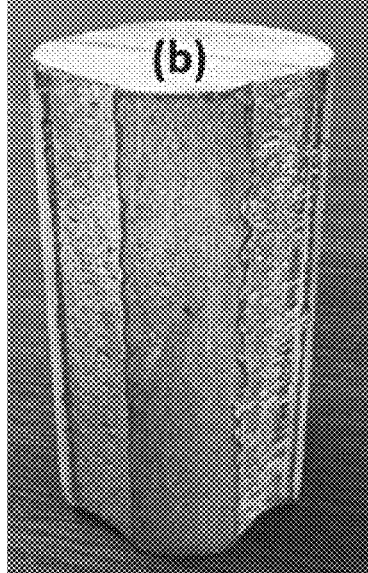
Figure 10:
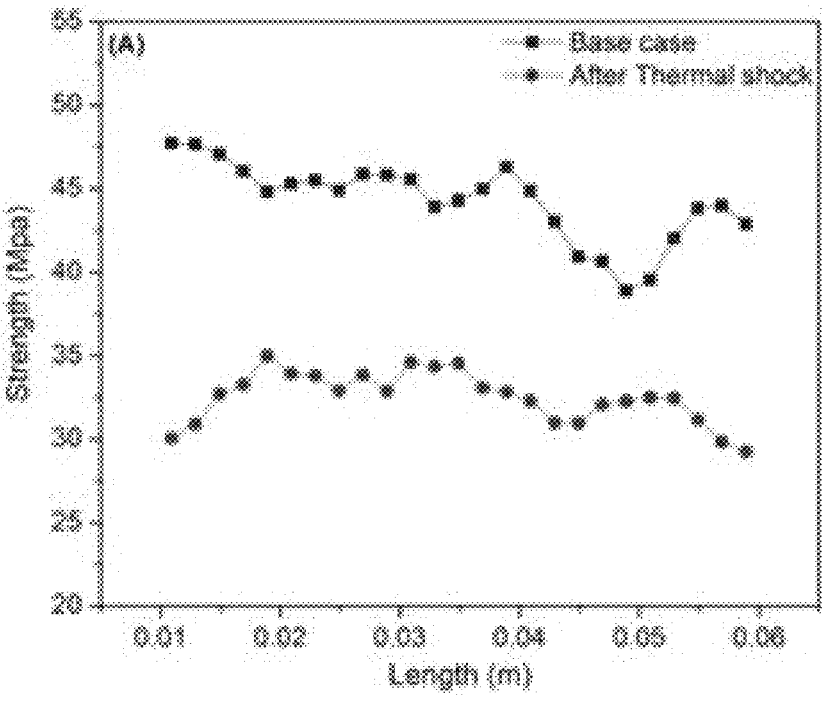
FIG. 10 illustrates the results of a scratch test to a Kentucky Sandstone core before and after exposure to the crosslinked endothermic fluid composition, both scratch tests performed on the same core to reduce variance by core heterogeneity.
Figure 11:
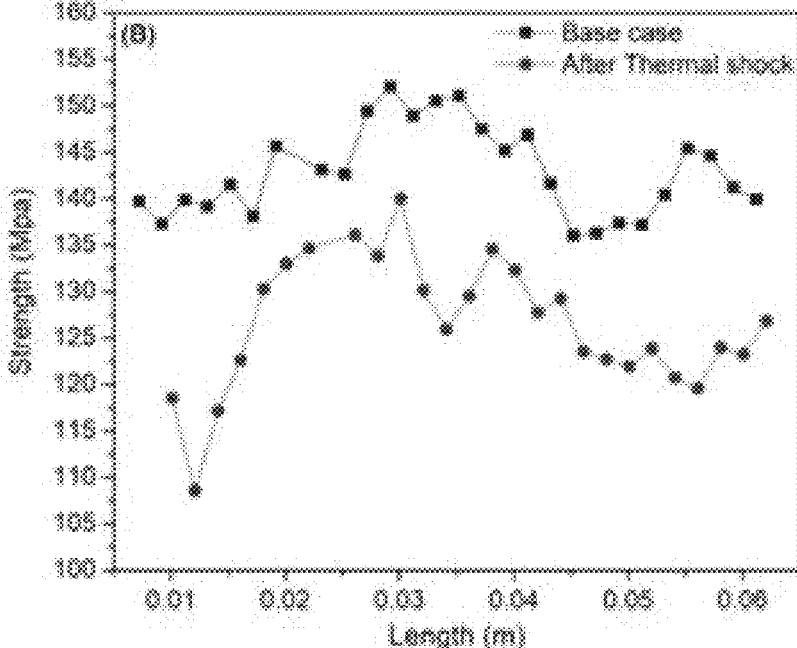
FIG. 11 illustrates the results of a scratch test to an Eagleford Shale core before and after exposure to the crosslinked endothermic fluid composition, both scratch tests performed on the same core to reduce variance by core heterogeneity.

Finally, the strength reduction capability of the crosslinked endothermic fluid composition was investigated by performing scratch tests on two core samples, namely Kentucky sandstone and Eagleford shale. The base case and thermal shock were performed on the same core to avoid any effect of core heterogeneity. Images of the Kentucky sandstone (a) and the Eagleford shale (b) after the tests are shown in FIG. 9. The experimental results of strength measurement using the scratch test are shown in FIGS. 10 and 11, with the results summarized in Table 3 below.

TABLE 3

| | | Average Strength (MPa) | | |
|---|---|---|---|---|
| S. | | | After thermal | Percentage |
| No. | Core | Base | shock | Reduction |
| 1 | Kentucky Sandstone | 44.25 | 32.49 | 26.57% |
| 2 | Eagle Ford Shale | 142.92 | 126.56 | 11.44% |

Summary of Strength Tests on Core Samples

It can be observed that the strength of Kentucky sandstone reduces from 44.25 to 32.49 MPa due to the effect of thermal shock. Whereas for Eagleford shale the reduction is from 142.92 to 126.56 Mpa. The reduction in strength was almost 1700 psi and 2372 psi for sandstone and shale respectively. The reduction in strength due to thermal shock will be helpful for an easier hydraulic fracturing job with less breakdown pressure.

It is noted that recitations in the present disclosure of a component of the present disclosure being "operable" or "sufficient" in a particular way, to embody a particular property, or to function in a particular manner, are structural recitations, as opposed to recitations of intended use. More specifically, the references in the present disclosure to the manner in which a component is "operable" or "sufficient" denotes an existing physical condition of the component and, as such, is to be taken as a definite recitation of the structural characteristics of the component.

It is also noted that recitations herein of "at least one" component, element, etc., should not be used to create an inference that the alternative use of the articles "a" or "an"

should be limited to a single component, element, etc. The singular forms "a," "an" and "the" include plural referents, unless the context clearly dictates otherwise.

Throughout this disclosure ranges are provided. It is envisioned that each discrete value encompassed by the ranges are also included. Additionally, the ranges which may be formed by each discrete value encompassed by the explicitly disclosed ranges are equally envisioned.

It is noted that one or more of the following claims utilize the term "wherein" as a transitional phrase. For the purposes of defining the present invention, it is noted that this term is introduced in the claims as an open-ended transitional phrase that is used to introduce a recitation of a series of characteristics of the structure and should be interpreted in like manner as the more commonly used open-ended pre-amble term "comprising." It is noted that the use of the terms "having" or "including", or grammatical variations thereof, in this disclosure should also be interpreted in like manner as the more commonly used open-ended preamble term "comprising".

As used in this disclosure, terms such as "first" and "second" are arbitrarily assigned and are merely intended to differentiate between two or more instances or components. It is to be understood that the words "first" and "second" serve no other purpose and are not part of the name or description of the component, nor do they necessarily define a relative location, position, or order of the component. Furthermore, it is to be understood that the mere use of the term "first" and "second" does not require that there be any "third" component, although that possibility is contemplated under the scope of the present disclosure.

It is noted that recitations herein of a component of the present disclosure being "configured" or "programmed" in a particular way, to embody a particular property, or to function in a particular manner, are structural recitations, as opposed to recitations of intended use. More specifically, the references herein to the manner in which a component is "configured" or "programmed" denotes an existing physical condition of the component and, as such, is to be taken as a definite recitation of the structural characteristics of the component.

It is noted that terms like "preferably," "commonly," and "typically," when utilized herein, are not utilized to limit the scope of the claimed invention or to imply that certain features are critical, essential, or even important to the structure or function of the claimed invention. Rather, these terms are merely intended to identify particular aspects of an embodiment of the present disclosure or to emphasize alternative or additional features that may or may not be utilized in a particular embodiment of the present disclosure.

Having described the subject matter of the present embodiments herein in detail and by reference to specific embodiments thereof, it is noted that the various details disclosed herein should not be taken to imply that these details relate to elements that are essential components of the various embodiments described herein, even in cases where a particular element is illustrated in each of the drawings that accompany the present description. Further, it will be apparent that modifications and variations are possible without departing from the scope of the present embodiments including, but not limited to, embodiments defined in the appended claims. More specifically, although some aspects of the present embodiments are identified herein as preferred or particularly advantageous, it is contemplated that the present embodiments is not necessarily limited to these aspects.

What is claimed is:

1. A method of thermally shocking a subsurface formation, the method comprising:
crosslinking an endothermic fluid composition over-saturated with ammonium chloride with a crosslinker to form a crosslinked endothermic fluid composition, the endothermic fluid composition comprising an aqueous solution, a polymer, ammonium chloride dissolved in the aqueous solution, and ammonium chloride suspended in the aqueous solution;
introducing the crosslinked endothermic fluid composition into a wellbore fluidly connected to the subsurface formation;
exposing the crosslinked endothermic fluid composition to the subsurface formation, wherein a temperature of the subsurface formation breaks the crosslink of the crosslinked endothermic fluid composition and exposes the ammonium chloride dissolved in the aqueous solution and the ammonium chloride suspended in the aqueous solution;
reacting the ammonium chloride dissolved in the aqueous solution and the ammonium chloride suspended in the aqueous solution that has been exposed with fluids of the subsurface formation, thereby decreasing a temperature of the subsurface formation and producing ammonia; and
thermally shocking the subsurface formation via the decreased temperature and produced ammonia, thereby inducing one or more fractures in the subsurface formation.

2. The method of claim 1, further comprising:
introducing an endothermic booster fluid into the wellbore before or after introducing the crosslinked endothermic fluid composition, the endothermic booster fluid comprising a second aqueous solution and a hydroxide-containing compound;
reacting the ammonium chloride dissolved in the aqueous solution and the ammonium chloride suspended in the aqueous solution that has been exposed with the hydroxide-containing compound of the endothermic booster fluid, thereby further decreasing a temperature of the subsurface formation and producing additional ammonia;
thermally shocking the subsurface formation via the decreased temperature and ammonia, thereby inducing one or more additional fractures in the subsurface formation.

3. The method of claim 2, wherein the hydroxide-containing compound is sodium hydroxide.

4. The method of claim 2, further comprising introducing a spacer fluid into the wellbore between introducing the endothermic booster fluid and the crosslinked endothermic fluid composition.

5. The method of claim 1, wherein:
the polymer is guar; and
the crosslinker is borate.

6. The method of claim 5, wherein the guar is carboxy methyl hydroxyl propyl guar (CMHPG).

7. The method of claim 1, wherein reacting the ammonium chloride with the subsurface formation reduces:
a compressive strength of the subsurface formation by at least 10 percent;
a Poisson's ratio of the subsurface formation by at least 10 percent; or
both.

8. The method of claim 1, further comprising introducing a hydraulic fracturing composition into the subsurface formation after reacting the ammonium chloride dissolved in the aqueous solution and the ammonium chloride suspended in the aqueous solution that has been exposed with the subsurface formation, thereby increasing a size of the one or more fractures in the subsurface formation.

9. The method of claim 8, further comprising introducing a proppant into the subsurface formation with the hydraulic fracturing composition, the crosslinked endothermic fluid composition, or both, thereby propping open the one or more fractures in the subsurface formation.

10. The method of claim 1, wherein the subsurface formation is an unconventional reservoir.

11. The method of claim 1, wherein the subsurface formation is a shale.

12. The method of claim 1, further comprising:
adding the polymer to the aqueous solution;
adding the ammonium chloride to the aqueous solution, thereby decreasing a temperature of the aqueous solution;
continuing to add the ammonium chloride to the aqueous solution after the temperature of the aqueous solution stabilizes, thereby forming the endothermic fluid composition; and
adding the crosslinker to the endothermic fluid composition, thereby forming the crosslinked endothermic fluid composition.

13. A method of thermally shocking a subsurface formation, the method comprising:
crosslinking an endothermic fluid composition with a crosslinker to form a crosslinked endothermic fluid composition, the endothermic fluid composition comprising an aqueous solution, a polymer, and ammonium chloride;
introducing the crosslinked endothermic fluid composition into a wellbore fluidly connected to the subsurface formation;
introducing an endothermic booster fluid into the wellbore before or after introducing the crosslinked endothermic fluid composition, the endothermic booster fluid comprising a second aqueous solution and a hydroxide-containing compound;
exposing the crosslinked endothermic fluid composition to the subsurface formation, wherein a temperature of the subsurface formation breaks the crosslink of the crosslinked endothermic fluid composition and exposes the ammonium chloride;

reacting the ammonium chloride that has been exposed with fluids of the subsurface formation, thereby decreasing a temperature of the subsurface formation and producing ammonia;
reacting the ammonium chloride with the hydroxide-containing compound of the endothermic booster fluid, thereby further decreasing a temperature of the endothermic fluid composition and producing additional ammonia; and
thermally shocking the subsurface formation via the decreased temperature and produced ammonia, thereby inducing a plurality of fractures in the subsurface formation.

14. The method of claim 13, wherein the hydroxide-containing compound is sodium hydroxide.

15. The method of claim 13, further comprising introducing a spacer fluid into the wellbore between introducing the endothermic booster fluid and the crosslinked endothermic fluid composition.

16. The method of claim 13, wherein:
a molar ratio between the sodium hydroxide and the ammonium chloride is from 1:1 to 15:1 sodium hydroxide to ammonium chloride;
a concentration of the ammonium chloride in the crosslinked endothermic fluid composition is from 0.1 Molar to 5 Molar;
a concentration of the sodium hydroxide in the endothermic booster fluid is from 0.1 Molar to 32 Molar; or combinations thereof.

17. The method of claim 13, wherein:
the polymer is guar; and
the crosslinker is borate.

18. The method of claim 17, wherein the guar is carboxy methyl hydroxyl propyl guar (CMHPG).

19. The method of claim 13, further comprising introducing a hydraulic fracturing composition into the subsurface formation after reacting the ammonium chloride with the subsurface formation, thereby increasing a size of the plurality of fractures in the subsurface formation.

20. The method of claim 19, further comprising introducing a proppant into the subsurface formation with the hydraulic fracturing composition, the crosslinked endothermic fluid composition, or both, thereby propping open the plurality of fractures in the subsurface formation.

* * * * *